(12) United States Patent
Bergeron et al.

(10) Patent No.: US 9,703,093 B2
(45) Date of Patent: Jul. 11, 2017

(54) ELECTROWETTING ELEMENT WITH NON-SWITCHABLE COLOR FILTER

(71) Applicant: Amazon Technologies, Inc., Seattle, WA (US)

(72) Inventors: Nicolas Eugene Bergeron, Stein (NL); Andrea Giraldo, Riehen (CH)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/362,425

(22) Filed: Nov. 28, 2016

(65) Prior Publication Data
US 2017/0075104 A1 Mar. 16, 2017

Related U.S. Application Data

(63) Continuation of application No. 14/179,032, filed on Feb. 12, 2014, now Pat. No. 9,513,474.

(51) Int. Cl.
*G09G 3/28* (2013.01)
*G02B 26/00* (2006.01)
*G02B 5/22* (2006.01)

(52) U.S. Cl.
CPC ............. *G02B 26/005* (2013.01); *G02B 5/22* (2013.01)

(58) Field of Classification Search
None
See application file for complete search history.

(56) References Cited

U.S. PATENT DOCUMENTS

| 2006/0087603 | A1 | 4/2006 | Lee |
| 2007/0121039 | A1 | 5/2007 | Tago et al. |
| 2012/0162269 | A1 | 6/2012 | Bohn et al. |
| 2013/0155480 | A1 | 6/2013 | Lee et al. |
| 2013/0182309 | A1 | 7/2013 | Kim et al. |
| 2014/0029080 | A1 | 1/2014 | Hwang |

FOREIGN PATENT DOCUMENTS

| FR | 2877105 A1 | 4/2006 |
| WO | 2013050515 A2 | 6/2013 |

*Primary Examiner* — Nicholas Lee
(74) *Attorney, Agent, or Firm* — EIP US LLP

(57) ABSTRACT

A display apparatus includes an electrowetting element including a non-switchable color filter, a first support plate with a surface having a first part overlapped by the non-switchable color filter and a second part not overlapped by the non-switchable color filter, and a first and second fluid. A control apparatus of the display apparatus is operable to switch the first fluid between at least a first configuration with the first fluid in contact with the first part but not substantially in contact with the second part and a second configuration with the first fluid in contact with the second part and with the first fluid being at least one of: not substantially in contact with the first part or at least partly in contact with the first part.

23 Claims, 5 Drawing Sheets

ELECTROWETTING ELEMENT WITH NON-SWITCHABLE COLOR FILTER

CROSS-CITATION TO RELATED APPLICATIONS

This is a continuation of U.S. patent application Ser. No. 14/179,032, filed on Feb. 12, 2014, the contents of which are incorporated herein in their entirety.

BACKGROUND

Electrowetting display devices are known. In an off state of a picture element of such a device an oil layer covers a display area. In an on state the oil layer is retracted so as to cover less of the display area. To switch the picture element to the on state a voltage is applied via an electrically conductive fluid immiscible with the oil. To switch the picture element to the off state, the voltage is switched off.

It is known to use a color filter in an electrowetting picture element. However, a colored display effect provided by the electrowetting element may have too low a brightness for certain applications.

It is desirable to improve a display effect provided by an electrowetting element.

DETAILED DESCRIPTION

Figure 1:
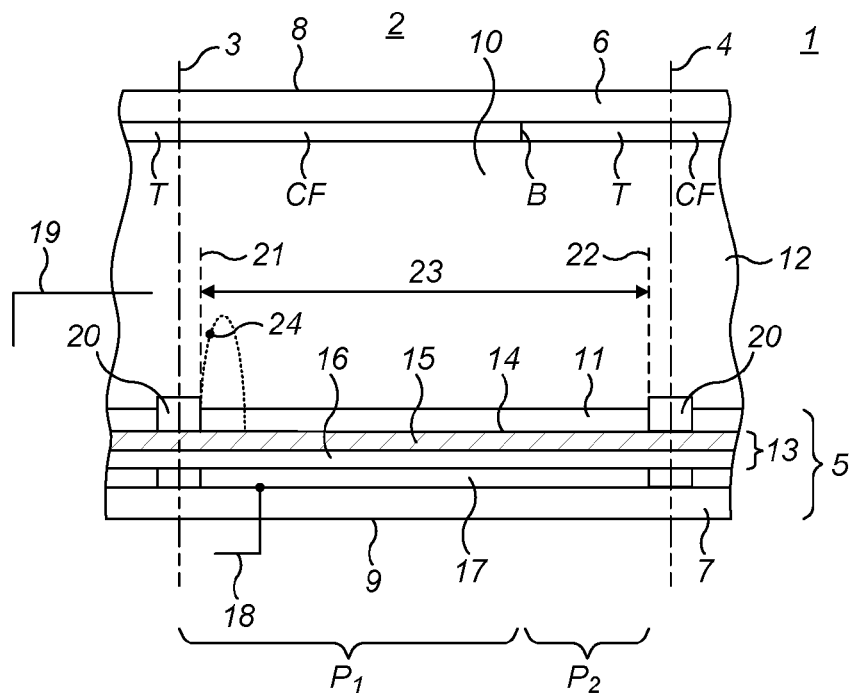
FIG. 1 shows schematically an example electrowetting element.

FIG. 1 shows a diagrammatic cross-section of part of an example of an electrowetting device. In this example the device is an electrowetting display device 1 including a plurality of electrowetting elements, which are picture elements 2, one of which is shown in the Figure. In examples, a plurality of electrowetting elements may define a pixel for providing a display effect, each electrowetting element of the plurality being a sub-pixel for providing a sub-pixel display effect. The lateral dimension of the picture element is indicated in the Figure by two dashed lines 3, 4. The picture elements comprise a first support plate 5 and a second support plate 6. The support plates may be separate parts of each picture element, but the support plates may be shared in common by the plurality of picture elements. The support plates may include a glass or polymer substrate 6, 7 and may be rigid or flexible.

In examples to be described, the electrowetting element includes a non-switchable color filter, which is also referred to below as a color filter. In other words, the color filter has a fixed shape and therefore a spatial configuration of the non-switchable color filter is not changeable, i.e. switchable. Thus, the non-switchable color filter may be a non-fluid color filter. This may be contrasted with for example the first fluid described below, which may include a dye or pigment therefore to act as a color filter which is switchable between different first fluid configurations. As explained below, the color filter further determines a display effect provided by the electrowetting element, in addition to a configuration of the first and second fluids. In the example of FIG. 1 there is a color filter layer, in other words a layer including a color filter, and in this example is lying on a surface of the second support plate 6, which surface faces the space described below. It is to be appreciated in further examples that the color filter layer may be located in a different position in the electrowetting element, for example on a surface of the second support plate facing away from the space or as part of the first support plate, provided the color filter layer is located such that light passing through the element to provide a display effect passes through the color filter layer.

In the example shown in FIG. 1, the color filter layer has a first region and a second region different from the first region. The first region comprises the non-switchable color filter CF. The color filter absorbs at least one wavelength of light, for example in the visible spectrum, thus filtering the light passing through the color filter. The color filter may be formed of a material having a color filtering property, or may comprise a layer of a material transmissive for substantially all wavelengths of light, in for example the visible spectrum, with a coating to act as the color filter. The second region is a transmissive region T which is for example transmissive, for at least one wavelength of light which is absorbed by the color filter and for example is transmissive for substantially all light incident on the second region, for example substantially all wavelengths of light in the visible light spectrum. The term substantially used here means there is a degree of tolerance in the amount of light transmitted by the second region. The transmissive region may not therefore transmit all light but may transmit enough light such that a performance of the electrowetting element is not impeded. For example, the second region may transmit 90%, 95% or greater of light incident on the second region. The second region may for example transmit three times greater, or more, light than the first region. The second region may for example be formed of a suitable material or may be an opening, in other words an aperture or a hole or a space, in the color filter layer, through which light may pass. Examples of a material for forming the color filter include a resist material such as the JSR OPTMER™ CR series. These are pigment dispersed photo-resists. Where the second region is formed of a material, an example material for forming the second region is selected from the JSR OPT-MER SS series. These are heat-curable materials which can be used as protective overcoatings for a color filter region, but which can also be used to form the second region. They are mainly composed of acrylic polymers. The color filter and the transmissive region join each other at a boundary B; the color filter and the transmissive region lie adjacent to each other along a plane parallel to the display area.

The display device has a viewing side 8 on which an image or display formed by the display device can be viewed and a rear side 9. In the Figure the first support plate 5 defines the rear side 9 and the second support plate 6 defines the viewing side; alternatively, the first support plate may define the viewing side. The display device may be of the reflective, transmissive or transflective type. The display device may be of a segmented display type in which the image may be built up of segments, each segment including several picture elements. The display device may be an active matrix driven display device, a direct drive display device or a passively driven display device. The plurality of picture elements may be monochrome. For a color display device the picture elements may be divided in groups, each group having a different color; alternatively, an individual picture element may be able to show different colors.

A space 10 between the support plates is filled with two fluids: a first fluid 11 and a second fluid 12 at least one of which may be a liquid. The second fluid is immiscible with the first fluid. The second fluid is electrically conductive or polar and may be water or a salt solution such as a solution of potassium chloride in water. The second fluid may be transparent, but may instead be colored, white, absorbing or reflecting. The first fluid is electrically non-conductive and may for instance be an alkane like hexadecane or may be an oil such as silicone oil.

The first fluid absorbs at least a part of the optical spectrum. The first fluid may be transmissive for a part of the optical spectrum, forming a color filter. For this purpose the first fluid may be colored by addition of pigment particles or a dye. Alternatively, the first fluid may be black, i.e. absorb substantially all parts of the optical spectrum, or reflecting. A reflective first fluid may reflect the entire visible spectrum, making the layer appear white, or part of it, making it have a color. In examples to be described below, the first fluid is black and therefore absorbs substantially all parts of the optical spectrum, for example in the visible light spectrum. The term "substantially absorbs" includes a degree of variation, therefore the first fluid may not absorb all wavelengths, but the majority of wavelengths within a given spectrum such as the visible spectrum, so as to perform the function of the first fluid in the element. The first fluid is therefore configured to absorb substantially all light incident on the first fluid. For example the first fluid may absorb 90% or more of light in the visible spectrum and incident on the first fluid.

The support plate 5 includes an insulating layer 13. The insulating layer may be transparent or reflective. The insulating layer 13 may extend between walls of a picture element. To avoid short circuits between the second fluid 12 and electrodes arranged under the insulating layer, layers of the insulating layer may extend uninterrupted over a plurality of picture elements 2, as shown in the Figure. The insulating layer has a surface 14 facing the space 10 of the picture element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon®AF1600. The barrier layer 16 may have a thickness, taken in a direction perpendicular the plane of the substrate, between 50 nanometers and 500 nanometers and may be made of an inorganic material like silicon oxide or silicon nitride or a stack of these (for example, silicon oxide—silicon nitride—silicon oxide) or an organic material like polyimide or parylene. The barrier layer may comprise multiple layers having different dielectric constants.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each element 2 includes an electrode 17 as part of the support plate 5. In examples shown there is one such electrode 17 per element. The electrode 17 is separated from the fluids by the insulating layer 13; electrodes of neighboring picture elements are separated by a non-conducting layer.

In some examples, further layers may be arranged between the insulating layer 13 and the electrode 17. The electrode 17 can be of any desired shape or form. The electrode 17 of a picture element is supplied with voltage signals by a signal line 18, schematically indicated in the Figure. A second signal line 19 is connected to an electrode that is in contact with the conductive second fluid 12. This electrode may be common to all elements, when they are fluidly interconnected by and share the second fluid, uninterrupted by walls. The picture element 2 can be controlled by a voltage V applied between the signal lines 18 and 19. The electrodes 17 on the substrate 7 are coupled to a display control apparatus. In a display device having the picture elements arranged in a matrix form, the electrodes can be coupled to a matrix of control lines on the substrate 7.

The first fluid 11 in this example is confined to one picture element by at least one wall, in this example walls 20 that follow the cross-section of the picture element. The cross-section of a picture element may have any shape; when the picture elements are arranged in a matrix form, the cross-section is usually square or rectangular. Although the walls are shown as structures protruding from the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The dimension of the picture element, indicated by the dashed lines 3 and 4, is defined by the center of the walls 20. The area of the surface 14 between the walls of a picture element, indicated by the dashed lines 21 and 22, is called the display area 23, over which a display effect occurs. The display effect depends on a size of area that the first and second fluids adjoin the surface defined by the display area, in dependence on the magnitude of the applied voltage V described above. The magnitude of the applied voltage V therefore determines the configuration of the first and second fluids within the electrowetting element. When switching the electrowetting element from one fluid configuration to a different fluid configuration the size of area of second fluid adjoining the display area surface may increase or decrease, with the size of area of first fluid adjoining the display area surface decreasing or increasing, respectively. Thus, for a plurality of fluid configurations, the size of area that the first fluid and the second fluid adjoin the display area may be different for different of the plurality of configurations.

Figure 2:
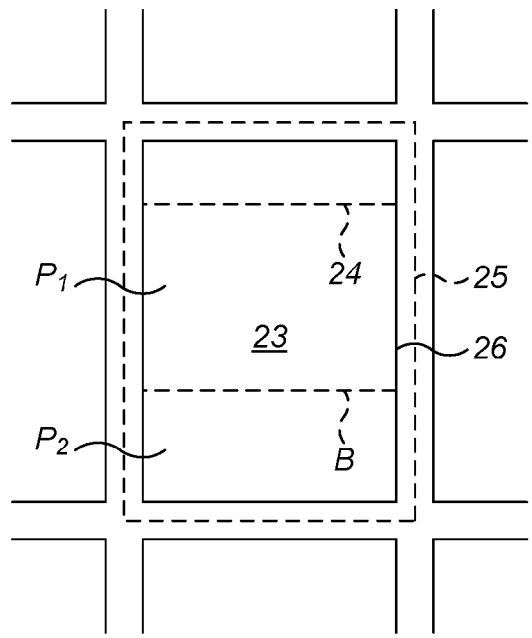
FIG. 2 shows schematically an example electrowetting element.

FIG. 2 shows a matrix of rectangular picture elements in a plan view of the hydrophobic layer of the first support plate. The dimension of the central picture element in FIG. 2, corresponding to the dashed lines 3 and 4 in FIG. 1, is indicated by the dashed line 25. Line 26 indicates the inner border of a wall; the line is also the edge, i.e. a perimeter, of the display area 23.

As will be described further below, in examples described herein, an extent of the color filter CF in a plane parallel to a plane of the display area is smaller, i.e. less, than the display area. The extent of the color filter is the extent, for example an area, of the color filter which overlaps with, i.e. lies over, the display area and through which light may pass for providing a display effect. For example, the extent may be an area of a surface of the color filter facing the space. In known elements, a color filter has an extent which is the same or larger than the display area; therefore, all light passing through the display area also passes and/or has passed (depending on the construction of the element) through the color filter. In the present examples, with the smaller extent of the color filter than the display area, a proportion of light passing or having passed through the display area may have not or may not pass through the color filter. As will be explained below, this means that a brighter colored display effect or a white display effect may be provided, for example. It is noted that the non-switchable color filter may for example partially overlap the at least one wall.

When no voltage is applied between the electrodes, i.e. when the electrowetting element is in an off state, the first fluid 11 forms a layer between the walls 20, as shown in the FIG. 1. Application of a voltage will contract the first fluid, for example against a wall as shown by the dashed shape 24 in FIG. 1. The controllable shape of the first fluid, in dependence on the magnitude of applied voltage, is used to operate the picture element as a light valve, providing a display effect over the display area 23. For example, switching the fluids to increase adjoinment of the second fluid with the display area may increase the brightness of the display effect provided by the element.

As illustrated in FIGS. 1 and 2, the display area may be divided into two parts; a first part Pi of the display area which is overlapped by the extent of the first region, i.e. the color filter; and a second part $P_2$ of the display area which is overlapped by the extent of the second region, i.e. the transmissive region. The first and second parts $P_1$, $P_2$ are divided by a boundary B illustrated in FIG. 2 with a dashed line B which corresponds with the boundary between the first and second regions of the color filter layer. For the first part, the perimeter of the first part of the display area, if projected along an axis perpendicular to the plane of the display area, would substantially align with or be overlapped by a perimeter of the extent of the color filter. For the second part, the perimeter of the second part of the display area, if projected along an axis perpendicular to the plane of the display area, would substantially align with or be overlapped by a perimeter of the extent of the transmissive region. The term "substantially aligned" includes a degree of variation from a strict alignment along the axis perpendicular to the plane of the display area. In other words, the first part may be sufficiently aligned with the extent of the first region and the second part may be sufficiently aligned with the extent of the second region so as not to impede the function of the electrowetting element. As can be seen from FIG. 2, a sum of the extent of the color filter and of the extent of the transmissive region, taken in a plane parallel to the display area, equals the display area. For example, the extent of the color filter may correspond with 60% of the display area and the extent of the transmissive region may correspond with 40% of the display area.

With the first and second parts being substantially aligned with the extent of the first and second regions, respectively, the display area and the color filter CF are arranged in this example such that a first portion of light for providing a display effect passes through both the display area (namely the first part) and the color filter, whereas a second portion of light passes through the display area (namely the second part) but not the color filter area. Instead, the second portion of light passes through the transmissive region T.

It is noted that in a transmissive type of display, light from a backlight for example passes from the rear side 9 to the viewing side 8. In a reflective type of display, light may enter the element 2 through the viewing side 8, pass through the display area and be reflected by a reflector (not illustrated) back towards the viewing side. In both a transmissive and a reflective type of display, the color filter layer is appropriately located in the path of light for providing a display effect.

Examples to be described relate to a transmissive type of display using a backlight which emits white light, but it is to be appreciated that the principles described are applicable to a reflective type of display and/or to a transmissive type using light from a backlight of a different color.

A display effect provided at the viewing side is determined in dependence on a configuration of the fluids. Depending on the size of area of the first fluid which adjoins the display area and the location where the first fluid adjoins the display area, light entering the rear side can be modified to pass through at least part of both the color filter and the transmissive region, or instead to pass through one of the color filter and the transmissive region but not the other. Examples will now be described with reference to FIGS. 3A to 3D.

FIGS. 3A to 3D show the same view as FIG. 2 except that three adjacent electrowetting elements $2_R$, $2_G$, $2_B$ in a row are illustrated. In this example, the color filter of element $2_R$ is a red color filter for providing red light, the color filter of element $2_G$ is a green color filter for providing green light and the color filter of element $2_B$ is a blue color filter for providing blue light. Thus, each of elements $2_R$, $2_G$, $2_B$ may be considered a sub-pixel which together form a full color pixel, the color of the display effect depending on the amount of red, green and blue light provided by each element. It is to be appreciated that in further examples different colors of color filters may be used, in different combinations. For example, the color filter of three adjacent sub-pixels may be a cyan color filter, a magenta color filter and a yellow color filter, respectively. In this example, FIGS. 3A to 3D show the first and second parts of each electrowetting element being substantially aligned with each other, to the degree of alignment needed so as not to impede a function of the electrowetting element.

Example display effects for the present example will now be described with reference to FIGS. 3A to 3D. These examples assume that light passing from the rear side to the viewing side passes in a direction parallel to the dashed lines 3, 4, i.e. perpendicular to the display area plane. It is appreciated that in further examples light may travel in different directions; it is therefore envisaged in further examples that the size of area of adjoinment of the display area by the first fluid is selected to provide a desired display effect which takes into account the different directions of light travel.

FIGS. 3A to 3D show examples where the first fluid configuration is the same for each element. It is to be understood that the size of area that the first fluid adjoins the display area can be different for each element and that the first fluid may be independently switchable for each element. Thus, a pixel display effect may be formed by a combination of sub-pixel display effects from a different size of area of the first fluid adjoining the display area in different sub-pixels. Further fluid configurations are envisaged compared with those described below.

Figure 3A:
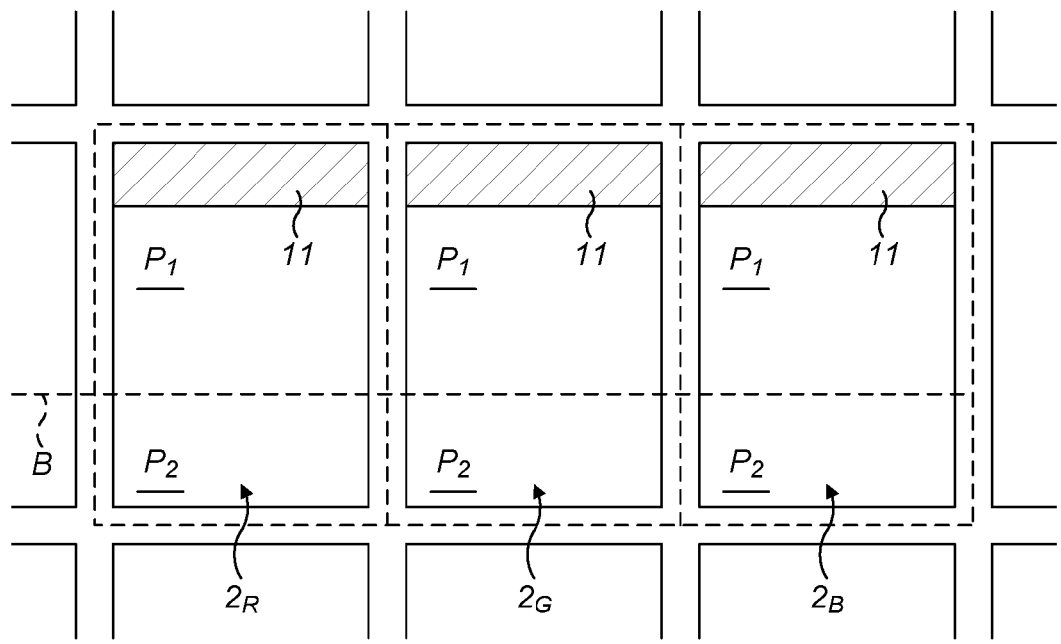
FIGS. 3A to 3D show schematically examples of fluid configurations for providing display effects.

FIG. 3A shows a configuration of the first fluid 11 adjoining an area of the display area within the first part $P_1$ and which is less than the area of the first part $P_1$. The first fluid therefore does not adjoin the second part. Thus, light passing from the rear side to the viewing side passes through a portion of the color filter CF where the first fluid does not lie in the path of the light passing through that portion. Further, light passing from the rear side to the viewing side passes through the transmissive region T. Thus, the display effect provided at the viewing side is a combination of light colored by the portion of the color filter and light transmitted by the transmissive region.

Figure 3B:
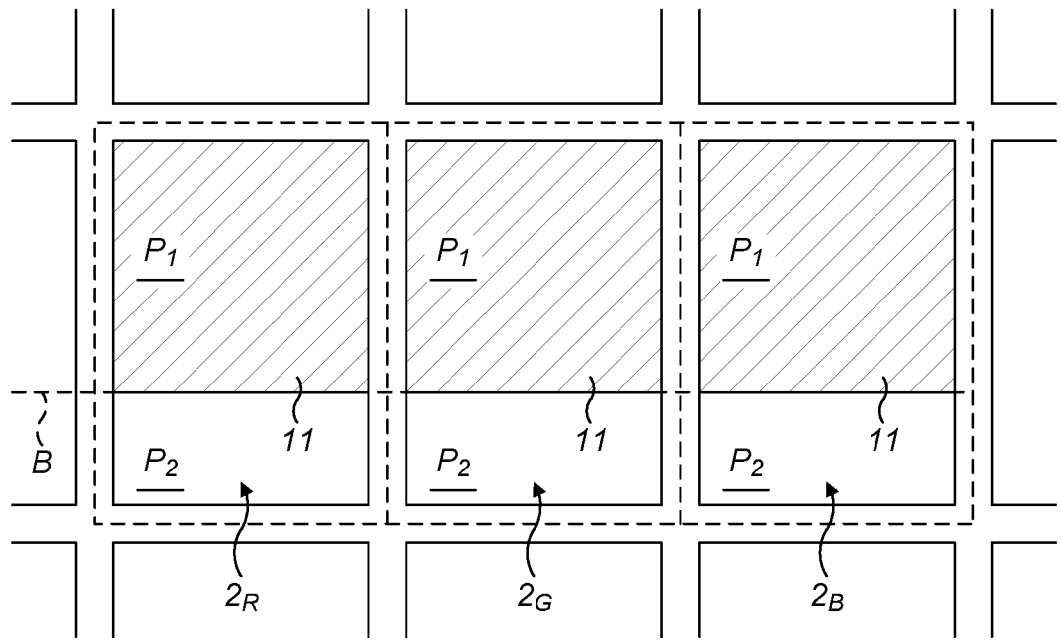

FIG. 3B shows a configuration of the first fluid 11 adjoining an area of the display area within the first part $P_1$ and which equals the area of the first part $P_1$. The first fluid therefore does not adjoin part of the second part. Thus, light passing from the rear side to the viewing side does not pass through the color filter CF as the first fluid lies in the path of the light. Further, light passing from the rear side to the viewing side passes through the transmissive region T. Thus, the display effect provided at the viewing side is light transmitted by the transmissive region and does not include light having passed through the color filter. With white light being emitted by the backlight, the display effect is a white display effect. A pixel of an electrowetting display device, comprising a plurality of electrowetting elements, may therefore be switched to a white display mode by switching the first fluid of each electrowetting element out of at least one light path of the respective electrowetting element enabling light to pass through the second region of the respective element.

A known electrowetting display device includes pixels comprising four electrowetting elements each being a sub-pixel for providing respectively a red (R) green (G), blue (B) and white (W) display effect. Such a pixel may be referred to as an RGBW pixel. Using the electrowetting element of examples described herein, a separate electrowetting element for providing a white display effect may not be needed. Instead, as explained using FIG. 3B, a white display effect may be provided using light passing through the transmissive region and not the color filter. With the second regions of the three elements $2_R$, $2_G$, $2_B$ being aligned with each other, a continuous region may be defined across the three elements, formed of the second regions, for providing the white display effect across. Thus, an RGBW pixel is provided without needing a separate electrowetting element for the white display effect. Using three sub-pixels rather than four for an RGBW pixel means a display device including such an RGBW pixel may have a higher resolution for images than a known RGBW display device. In effect, a white sub-pixel is provided within the architecture of an RGB pixel. Plus, as an RGB pixel architecture is a common architecture, the examples herein allow the RGB architecture to be simply modified to an RGBW pixel architecture.

Figure 3C:
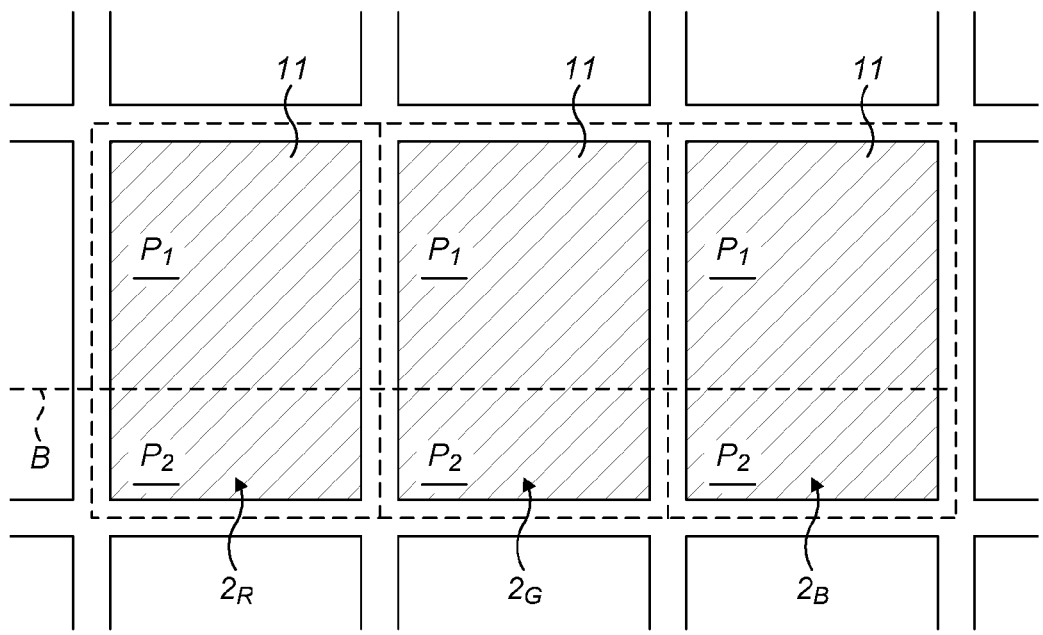

FIG. 3C shows a configuration of the first fluid 11 adjoining the entire area of the display area. In other words the first fluid adjoins both the first part and the second part, $P_1$ and $P_2$, of the display area. Thus, the first fluid absorbs substantially all light passing from the rear side. The display effect may therefore be considered a black display state.

The examples described so far in turn with FIGS. 3A to 3C have the first fluid contracted in the first part and spreading out further across the display area in a direction from the first part towards the second part. Depending on the magnitude of the applied voltage, further fluid configurations are envisaged than those shown in FIGS. 3A to 3C. In such examples including those of FIGS. 3A to 3C, the first fluid is pinned, i.e. fixed or located, at a location adjacent to the left hand wall as shown in FIG. 1, from which location the first fluid spreads out from or contracts towards when changing the fluid configuration.

Figure 3D:
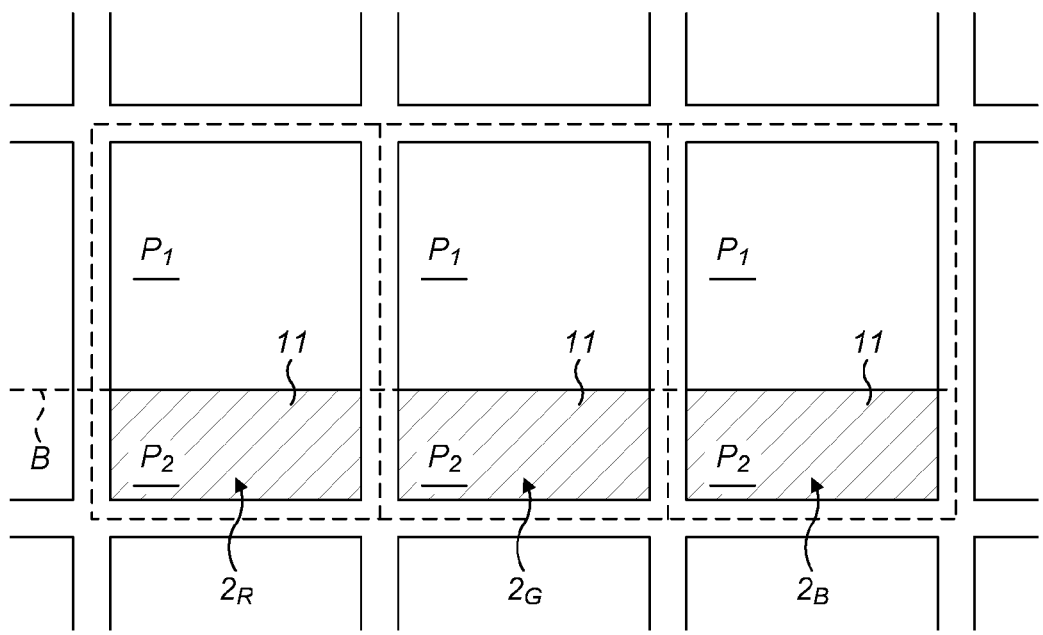

In alternative examples than those shown using FIGS. 3A to 3C, the first fluid may instead be moved differently, for example from a contracted configuration in the second part to spread out across the display area in a direction from the second part to the first part. In such examples the first fluid may instead be pinned at a location adjacent to the right hand wall as shown in FIG. 1, with the first fluid spreading out in a direction from the second part towards the first part, i.e. spreading out from the location, or contracting in a direction from the first part towards the second part, i.e. contracting towards the location at which the first fluid is pinned. For example, FIG. 3D shows one such example where the first fluid adjoins the area of the second part $P_2$ but does not adjoin the first part. Thus, the display effect provided at the viewing side is comprised of light colored by the color filter CF of each element and does not include light having passed through the transmissive region T. With the red, green and blue color filters, the display effect of the pixel is therefore a white display effect. Further examples are envisaged than that shown using FIG. 3D, with the first fluid being pinned at the right hand wall as shown. For example, a voltage may be applied such that the first fluid adjoins the area of the second part and part of the area of the first part. This would provide a display effect similar to that for FIG. 3D, but of a lower intensity as less light passes through the color filter CF. In another example, a voltage may be applied such that the first fluid adjoins part of the area of the second part, i.e. the first fluid adjoins less of the total area of the second part than in FIG. 3D. This example would provide a brighter display effect than in FIG. 3D as light also passes through part of the transmissive region. In such an example, the first fluid of each element shown in FIG. 3D may be configured to adjoin part of the area of the second part, i.e. less than the total area of the second part; in such an example a white display effect is provided, by a combination of light passing through the red, green and blue color filters and also through part of the transmissive region of each element. Thus, the three elements may function as a RGBW pixel. It is noted that the white display effect in the present example is of a greater color purity compared with the white display effect shown by FIG. 3B, as the first fluid does not adjoin the first part, meaning more light passes through the color filters than in the example of FIG. 3B.

In further examples, the display device may be configured such that a fluid configuration shown by FIGS. 3A to 3C and/or another fluid configuration with the first fluid being pinned at a first location (for example adjacent to the left hand wall shown in FIG. 1) may be obtained in addition to the fluid configuration of FIG. 3D and/or to another fluid configuration with the first fluid being pinned at a second, different, location (for example adjacent to the right hand wall shown in FIG. 1). Thus, a versatile electrowetting display device may be provided, with the fluid configuration being switchable such that light for providing a display effect may have passed for example through at least part of the color filter only, through at least part of the transmissive region only, or through at least part of each of the color filter and the transmissive region.

As explained above, the configuration of the first fluid of one element may be changed independently of another element. Therefore, referring to FIG. 3A for example, a first red display effect may be provided with the first fluid configuration of element $2_R$ as shown, which is a configuration with the first fluid partly adjoining the first part but not adjoining the second part. For the first red display effect the first fluid of elements $2_G$, $2_B$ may be configured as shown in FIG. 3C. Similarly, referring to FIG. 3D, a second red display effect may be provided using the second fluid configuration of element $2_R$ as illustrated, which is a configuration with the first fluid at least partly adjoining the second part but not or partly adjoining the first part. For the second red display effect the elements $2_G$, $2_B$ may be configured as illustrated in FIG. 3C. These two red display effects can be contrasted: in the first red display effect, as the first fluid is not configured to absorb light passing along a path through the transmissive region, light passes through the transmissive region and contributes to provide a red display effect with a higher brightness, i.e. luminance, than the second red display effect. However, as the light passing through the transmissive region is in this example white, the color saturation of the first red display effect is weakened, i.e. the first red display effect is paler than the second red display effect. In contrast, in the second red display effect, the first fluid is configured to absorb substantially all light on a path which would pass through the transmissive region. Therefore, in this example, the second red display effect is formed of light having passed through the color filter and not through the transmissive region. Thus, the second red display effect has a higher color saturation than the first red display effect, as there is no light passing through the transmissive region to weaken the color saturation. As a consequence, the second red display effect has a lower brightness than the first red display effect. A higher color saturation display effect may for example be desirable when the display is viewed in a well-lit, i.e. a highly illuminated, environment, whereas the higher brightness display effect may for example be desirable when the display is viewed in a poorly-lit, i.e. a low illumination, environment.

In some examples the display device may be configured to provide only colored display effects with a higher brightness such as the first red display effect, rather than display effects with a higher color saturation such as the second red display effect. In other examples the display device may be configured to provide only colored display effects with a higher color saturation such as the second red display effect, rather than display effects with a higher brightness such as the first red display effect. In further examples, the display device may be configured for providing display effects with a higher brightness such as the first red display effect and further display effects with a higher color saturation such as the second red display effect; an example of such as device is described using FIG. 4 below.

As explained, the first fluid may be switched differently in examples to provide a display effect of a desired color having a higher color saturation or a higher brightness. Further first fluid configurations than those described above for the first and second red display effects are envisaged, where the first fluid for example adjoins a greater or lower size of area of the display area. Further, the principles described here in relation to the red display effects may be applied to the green and blue elements and in further examples to elements for providing display effects of different colors.

Figure 4:
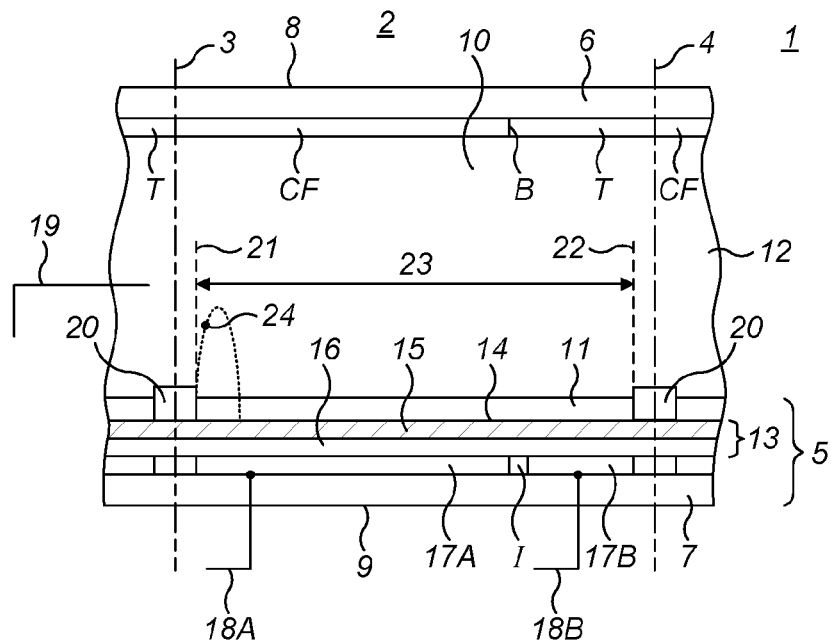
FIG. 4 shows schematically an example electrowetting element.

Various techniques may be used to control switching of the first and second fluids to obtain a desired display effect. For example, the first fluid configuration of FIGS. 3A, 3B and 3C may be obtained using the element of FIG. 1 for example, where the first fluid contracts to and spreads out from a location adjacent the wall on the left hand side of the Figure. However, in further examples, where for example the first fluid configuration of FIG. 3D is also to be provided and therefore where it is necessary to initiate motion of the fluids at more than one location on the display area, a plurality of electrodes may be used. An example of such an element is illustrated in FIG. 4. Features of the element of FIG. 4 are the same as those in FIG. 1 and are indicated with the same reference numerals. In this example, there are two electrodes, namely a first electrode 17A and a second electrode 17B, in an electrode layer of the first support plate 5. The electrodes 17A, 17B are separated by a non-conducting element I. The first electrode 17A in this example is located adjacent to and with a similar or the same dimension in a plane parallel to that of the display area, as the first part of the display area. The first electrode is at least partly overlapped by the first part of the display area. The second electrode 17B in this example is located adjacent to and with a similar or the same dimension in a plane parallel to that of the display area, as the second part of the display area. The second electrode is at least partly overlapped by the second part of the display area. An electrical potential may be applied to the first and second electrodes via a first and a second signal line 18A, 18B respectively. In order to drive the element to obtain the fluid configuration of FIGS. 3A, 3B and 3C, the same electrical potential may be applied to the first and second electrodes 17A, 17B, as if the first and second electrodes 17A, 17B act together as a single electrode. Or, in another example, a greater electrical potential may be applied to the second electrode 17B than to the first electrode 17A, to cause motion of the first fluid to initiate over the second electrode 17B and for the first fluid to move in a direction towards the first electrode 17A. To drive the element to obtain the fluid configuration of FIG. 3D, a greater electrical potential may be applied to the first electrode 17A than to the second electrode 17B, causing motion of the first fluid instead to initiate over the first electrode 17A and for the first fluid to move in a direction towards the second electrode 17B. In this way, the first fluid configuration can be switched differently depending on the desired display effect. It will be appreciated that application of appropriate electrical potentials to the first and/or second electrodes 17A, 17B allows the size of area of and location of adjoinment of the first fluid to the display area to be controlled.

Referring again to FIG. 1, another technique which may be used for controlling where motion of the first fluid occurs and therefore a configuration of the first fluid, is for example a rate at which a voltage is applied between the signal lines 18, 19. For example, a gradual application of a voltage may cause the first fluid to initiate at a right hand side of the element as illustrated in FIG. 1, for obtaining the display effects illustrated using FIGS. 3A, 3B and 3C. In contrast, by applying a voltage rapidly and immediately to the signal lines 18, 19 and possibly with a magnitude greater than needed for a desired display effect, the first fluid may start to move at a different location, for example at the left hand side of the element as illustrated in FIG. 1. Thus, a first fluid configuration according to that of FIG. 3D for example may be obtained. Such a technique may be used in combination with other techniques for controlling fluid motion.

Other known techniques for controlling fluid motion include shaping the electrode 17 of FIG. 1 with a cut-out, so that when applying a voltage between the signal lines 18, 19 the voltage is not applied across a portion of the display area. This encourages the first fluid to collect in that portion. It is also possible to use a surface with a different wettability to the first fluid than the display area surface, for example a hydrophilic surface, to determine where motion of the first fluid initiates when applying a voltage.

Figure 5:
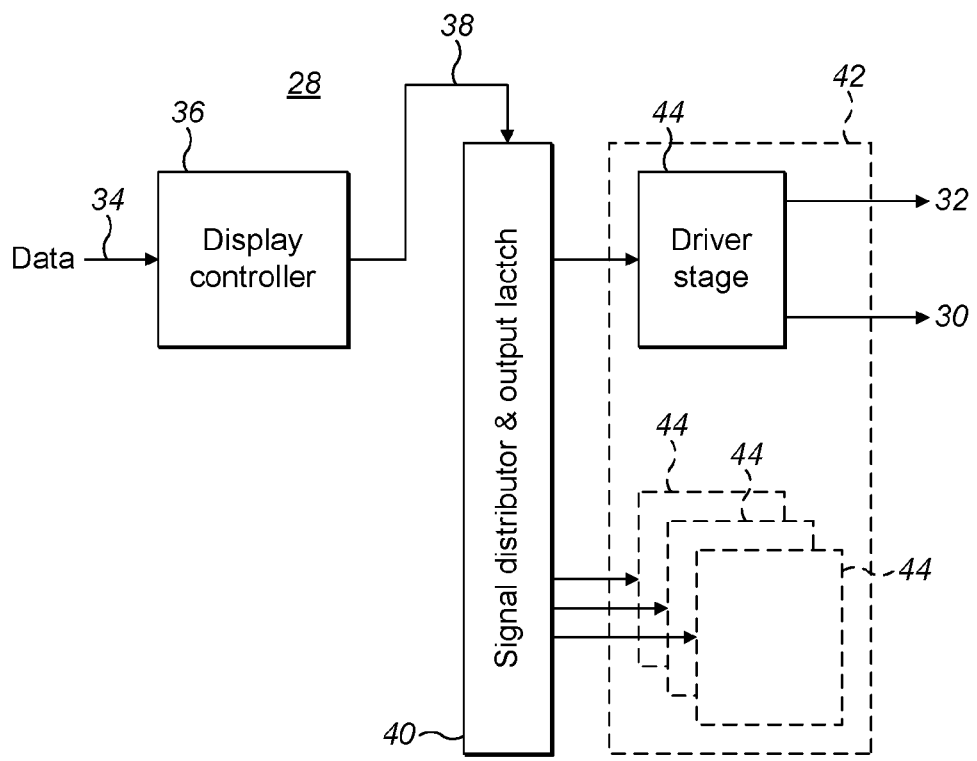
FIG. 5 shows an example of control apparatus for controlling an electrowetting element.

FIG. 5 shows schematically an example of control apparatus for controlling an electrowetting element such as that of FIG. 1 and for example for controlling a plurality of electrowetting elements arranged for example as a matrix in an electrowetting display device. The control apparatus in this example is for so-called direct driving of the electrowetting element(s) and may be in the form of an integrated circuit adhered to the support plate 6. An active matrix type display, which is known, may also use such a control apparatus. The control apparatus 28 includes control logic and switching logic. The apparatus is connected to each electrowetting element by means of signal lines 30 and a common signal line 32. Each electrode signal line 30 connects an output from the control apparatus 28 to a different electrode 17, respectively. The common signal line is connected to the second fluid 12 via an electrode. Also included are one or more input data lines 34, whereby the control apparatus can be instructed with data indicative of a desired display effect for each of the electrowetting elements; this input data may be video data, for example.

The example of the control apparatus includes a controller, such as a display controller 36 illustrated, e.g. a microcontroller, receiving input data from the input data lines 34 relating to an image to be displayed.

The display controller is arranged for controlling a voltage applied between the electrode 17 and the second fluid, via the signal lines 30, 32, thereby providing an electric field in the electrowetting element, which determines a configuration of the first and second fluids, thereby determining the display effect provided by the electrowetting element. The display controller controls a timing and/or a signal level of at least one signal level for each picture element.

The output 38 of the display controller is connected to the data input of a signal distributor and data output latch 40. The signal distributor distributes incoming data over a plurality of outputs connected to the display device, via drivers for example. The signal distributor causes data input indicating that a certain picture element is to provide a specific display effect to be sent to the output connected to this element. The distributor may be a shift register. The input data is clocked into the shift register and at receipt of a latch pulse the content of the shift register is copied to the output latch. The output latch has a one or more outputs, connected to a driver assembly 42. The outputs of the latch are connected to the inputs of one or more driver stages 44 within the control apparatus. The outputs of each driver stage are connected through the signal lines 30 and 32 to a corresponding picture element. In response to the input data 34 a driver stage will output a voltage of the signal level set by the display controller to set one of the picture elements to provide a corresponding display effect.

Figure 6:
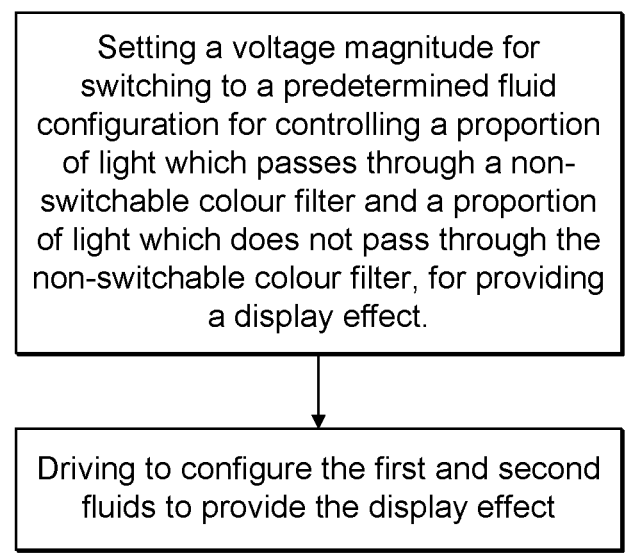
FIG. 6 shows a flow diagram of an example method of driving an electrowetting element.

The control apparatus is configured to drive the electrowetting element according to examples described herein. In examples, for example in accordance with FIG. 6, the control apparatus drives an electrowetting element by setting a magnitude of the applied voltage for switching the first and second fluids to a predetermined configuration for controlling a proportion of light which passes through the color filter (for example the first region) and a proportion of the light which does not pass through the color filter, for example which proportion passes through the second region, for providing the display effect. This setting may be performed by accessing data representing a look up table of voltage magnitude values corresponding to different predetermined fluid configurations, which data is stored in a memory, thereby determining the magnitude of the applied voltage to be set for applying to the element. Once the applied voltage for the required fluid configuration has been determined, the control apparatus drives the element to configure the first and second fluids to the predetermined configuration of the first and second fluids, to provide the display effect.

As explained above, for a given display effect to be provided by an element, for example having a particular greyscale value, i.e. intensity level, for a particular color, there may be two options available: a higher brightness display effect or a higher color saturation display effect. The display controller may therefore perform a method of driving the electrowetting element to select the display effect to provide. This selection may be made using input data indicative of for example a measure of illumination of the viewing side depending on the viewing environment, to determine which display effect to provide. For example, as explained above, in a well-lit environment the higher color saturation display effect may be provided whereas in a darker, more poorly-lit, environment the higher brightness display effect may be provided. Therefore, the display controller may perform a method of driving the electrowetting element including determining, for a given color of display effect to provide, whether to switch the electrowetting element to a fluid configuration for a higher color saturation display effect or whether to switch the electrowetting element to a fluid configuration for a higher brightness display effect. The display controller may then switch the electrowetting element to the appropriate fluid configuration, in dependence on the determination. Thus, the display controller selectively switches the electrowetting element to the first configuration or to the second configuration. As described earlier, the display controller may access stored data to look up the voltage magnitude to apply to the electrowetting element to obtain a desired display effect. Such data may also indicate a rate of applying the voltage and/or a magnitude of a voltage to apply to a plurality of electrodes of the element, such as the first and second electrodes 17A, 17B described previously, for driving the element in accordance with FIG. 4 for example.

In examples described above, the display controller includes at least one processor. This processor may be a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories. The processor may additionally, or in the alternative, contain memory, such as processor registers. Any of these memories may store display effect data as described above. Such a memory may also be a non-transitory computer readable storage medium having computer readable instructions, i.e. computer software, which when executed cause the at least one processor to perform a method according to examples described herein. Such computer software is therefore adapted to perform the method of examples herein. The one or more memories may include processor cache, including a multi-level hierarchical cache in which different levels have different capacities and access speeds. The memory may further include random access memory (RAM) and other volatile storage devices.

The above embodiments are to be understood as illustrative examples. Further embodiments are envisaged. For example, in examples described above, the first and second parts of the display area are each rectangular and are located at opposite sides of the display area. Thus, changing a size of area that the first fluid adjoins the display area by contracting or spreading out the first fluid in a direction from one of the opposite sides to the other, allows an amount of light contributing to the display effect to be controlled. Further examples are envisaged with different shapes and/or sizes of the first and second parts of the display area and therefore the extent of the second and first regions, than described here. In such examples, the first fluid configuration required to determine the display effect may be different from those described in FIGS. 3A to 3D and may be obtained using appropriate fluid motion control techniques, for example those described above. In further examples, the extent of the color filter and of the transmissive region and therefore the area of the first and second parts of the element may be different for different colors, so that the brightness of component colors for providing a display effect may be tuned in accordance with the human eye's sensitivity to light of different colors. For similar reasons, the concentration of pigment in the color filter may for example be different for color filters of different colors. Further, again for similar reasons, a brightness of a backlight for transmitting light through the element to the viewing side may be different for different colors of the color filter.

It is to be understood that any feature described in relation to any one embodiment may be used alone, or in combination with other features described and may also be used in combination with one or more features of any other of the embodiments, or any combination of any other of the embodiments. Furthermore, equivalents and modifications not described above may also be employed without departing from the scope of the accompanying claims.

What is claimed is:
1. A display apparatus comprising:
an electrowetting element comprising:
a non-switchable color filter configured to absorb at least one wavelength of visible light;
a first support plate comprising:
a surface having:
a first part overlapped by the non-switchable color filter, and
a second part not overlapped by the non-switchable color filter; and
an electrode;
a second support plate;
a first fluid;
a second fluid immiscible with the first fluid, the first fluid and the second fluid located between the first support plate and the second support plate; and
a control apparatus comprising:
at least one processor;
at least one memory comprising computer program instructions,
the at least one memory and the computer program instructions operable to, with the at least one processor, cause the control apparatus to switch the first fluid, by control of application of a voltage between the electrode and the second fluid, between at least:
a first configuration with the first fluid in contact with the first part but not substantially in contact with the second part; and
a second configuration with the first fluid in contact with the second part and with the first fluid being at least one of: not substantially in contact with the first part or at least partly in contact with the first part.

2. The display apparatus according to claim 1, wherein the at least one memory and the computer program instructions are operable to, with the at least one processor, cause the control apparatus to switch the first fluid:
to the first configuration by application of a first voltage with a first magnitude between the electrode and the second fluid; and
to the second configuration by application of a second voltage with a second magnitude, different from the first magnitude, between the electrode and the second fluid.

3. The display apparatus according to claim 1, wherein the electrode is a first electrode, the first electrode overlapped at least partly by the first part, the first support plate further comprising a second electrode overlapped at least partly by the second part,
the at least one memory and the computer program instructions operable to, with the at least one processor, cause the control apparatus to switch the first fluid to the first configuration by application of a greater electrical potential to the second electrode than to the first electrode.

4. The display apparatus according to claim 1, wherein the electrode is a first electrode, the first electrode overlapped at least partly by the first part, the first support plate further comprising a second electrode overlapped at least partly by the second part,
the at least one memory and the computer program instructions operable to, with the at least one processor, cause the control apparatus to switch the first fluid to the second configuration by application of a greater electrical potential to the first electrode than to the second electrode.

5. The display apparatus according to claim 1, wherein the at least one memory and the computer program instructions are operable to, with the at least one processor, cause the control apparatus to control a rate of application of the voltage between the electrode and the second fluid to control a location of initiation of motion of the first fluid upon application of the voltage.

6. The display apparatus according to claim 2, wherein the at least one memory and the computer program instructions are operable to, with the at least one processor, cause the control apparatus to switch the first fluid to the second configuration by application of a third voltage between the electrode and the second fluid with a larger magnitude than the second voltage, before application of the second voltage between the electrode and the second fluid.

7. The display apparatus according to claim 1, wherein the at least one memory and the computer program instructions are operable to, with the at least one processor, cause the control apparatus to switch the first fluid to the second configuration in response to input data representing a color display effect for display by the electrowetting element.

8. The display apparatus according to claim 1, wherein in the first configuration the first fluid is in contact with substantially all of the first part, the at least one memory and the computer program instructions operable to, with the at least one processor, cause the control apparatus to switch the first fluid to the first configuration in response to input data representing a white display effect for display by the electrowetting element.

9. The display apparatus according to claim 1, wherein, for a pre-determined color of display effect to provide, the at least one memory and the computer program instructions are operable to, with the at least one processor, cause the control apparatus to:
determine that a higher brightness display effect with a higher brightness and a lower color saturation than a higher color saturation display effect for the pre-determined color of display effect is to be provided, the first fluid in contact with a larger portion of the second part for the higher color saturation display effect than for the higher brightness display effect;
determine a higher brightness voltage magnitude of the voltage to apply between the electrode and the second fluid to provide the higher brightness display effect;
generate the voltage with the higher brightness voltage magnitude; and
apply the voltage with the higher brightness voltage magnitude between the electrode and the second fluid.

10. The display apparatus according to claim 1, wherein, for a pre-determined color of display effect to provide, the at least one memory and the computer program instructions are operable to, with the at least one processor, cause the control apparatus to:
determine that a higher color saturation display effect with a lower brightness and a higher color saturation than a higher brightness display effect for the pre-determined color of display effect is to be provided, the first fluid in contact with a larger portion of the second part for the higher color saturation display effect than for the higher brightness display effect;
determine a higher color saturation voltage magnitude of the voltage to apply between the electrode and the second fluid to provide the higher color saturation display effect;
generate the voltage with the higher color saturation voltage magnitude; and
apply the voltage with the higher color saturation voltage magnitude between the electrode and the second fluid.

11. The display apparatus according to claim 1, the display apparatus comprising a plurality of the electrowetting element, the plurality of the electrowetting element comprising a first one of the electrowetting element, a second one of the electrowetting element and a third one of the electrowetting element, wherein the electrowetting element is the first one of the electrowetting element, wherein:
the non-switchable color filter of the first one of the electrowetting element is a red non-switchable color filter configured to absorb at least a portion of red light;
the non-switchable color filter of the second one of the electrowetting element is a green non-switchable color filter configured to absorb at least a portion of green light; and the non-switchable color filter of the third one of the electrowetting element is a blue non-switchable color filter configured to absorb at least a portion of blue light.

12. The display apparatus according to claim 11, wherein:
the first one of the electrowetting element corresponds to a first sub-pixel of a pixel of the display apparatus,
the second one of the eletrowetting element corresponds to a second sub-pixel of the pixel, and
the third one of the electrowetting element corresponds to a third sub-pixel of the pixel,
wherein in the first configuration of, respectively, the first one of the electrowetting element, the second one of the electrowetting element and the third one of the electrowetting element, the first fluid is in contact with substantially all of the first part of, respectively, the first one of the electrowetting element, the second one of the electrowetting element and the third one of the electrowetting element, and
the at least one memory and the computer program instructions are operable to, with the at least one processor, cause the control apparatus to switch the first fluid of, respectively, the first one of the electrowetting element, the second one of the electrowetting element and the third one of the electrowetting element to the first configuration, in response to input data representing a white display effect for display by the pixel.

13. The display apparatus according to claim 11, wherein the first one of the electrowetting element, the second one of the electrowetting element and the third one of the electrowetting element are arranged consecutively in a row,
the second part of, respectively, the first one of the electrowetting element, the second one of the electrowetting element and the third one of the electrowetting element substantially aligned with each other.

14. The display apparatus according to claim 13, wherein the surface of the first support plate comprises a substantially continuous second part not overlapped by the non-switchable color filter, the substantially continuous second part comprising the second part of the first one of the electrowetting element, the second part of the second one of the electrowetting element and the second part of the third one of the electrowetting element.

15. The display apparatus according to claim 1, the electrowetting element comprising a color filter layer having a first region and a second region, the first region comprising the non-switchable color filter and the second part overlapped by the second region, the second region transmissive for at least one wavelength of light absorbable by the non-switchable color filter or for substantially all wavelengths of visible light.

16. The display apparatus according to claim 1, wherein the second support plate comprises the non-switchable color filter.

17. The display apparatus according to claim 1, the first support plate comprising at least one wall corresponding with a perimeter of the surface, the non-switchable color filter partly overlapping the at least one wall.

18. The display apparatus according to claim 1, the first support plate comprising at least one wall corresponding with a perimeter of the surface, wherein an extent of the non-switchable color filter in a plane parallel to a plane of the second support plate is smaller than the surface.

19. The display apparatus according to claim 1, wherein the first fluid comprises at least one of: a dye or a pigment for absorption of substantially all wavelengths of visible light incident on the first fluid.

20. A method of driving a display apparatus comprising an electrowetting element, the method comprising:
determining a first magnitude of a first voltage for switching a first fluid of the electrowetting element, the first fluid immiscible with a second fluid of the electrowetting element, to a first configuration, with the first fluid:
in contact with a first part of a surface of a support plate of the electrowetting element, the first part overlapped by a non-switchable color filter of the electrowetting element, the non-switchable color filter configured to absorb at least one wavelength of visible light; but not substantially in contact with a second part of the surface, the second part not overlapped by the non-switchable color filter, generating the first voltage with the first magnitude; and applying the first voltage with the first magnitude between an electrode of the support plate and the second fluid.

21. The method according to claim 20, comprising:

determining a second magnitude of a second voltage for switching the first fluid to a second configuration, with the first fluid in contact with the second part and at least one of: not substantially in contact with the first part or at least partly in contact with the first part, generating the second voltage with the second magnitude; and applying the second voltage with the second magnitude between the electrode and the second fluid.

22. The method according to claim 21, comprising determining the second magnitude of the second voltage in response to input data representing a color display effect for display by the electrowetting element.

23. The method according to claim 20, wherein, in the first configuration, the first fluid is in contact with substantially all of the first part, the determining the first magnitude, the generating the first voltage, and the applying the first voltage being in response to input data representing a white display effect for display by the electrowetting element.

* * * * *

UNITED STATES PATENT AND TRADEMARK OFFICE
CERTIFICATE OF CORRECTION

| | |
|---|---|
| PATENT NO. | : 9,703,093 B2 |
| APPLICATION NO. | : 15/362425 |
| DATED | : July 11, 2017 |
| INVENTOR(S) | : Bergeron et al. |

It is certified that error appears in the above-identified patent and that said Letters Patent is hereby corrected as shown below:

In the Claims

In Column 15, Line 57, in Claim 11, delete "the non-switchable color filter of the third" and insert the same at Line 58, before "one" as a new sub-point.

In Column 15, Line 64, in Claim 12, delete "eletrowetting" and insert -- electrowetting --, therefor.

Signed and Sealed this
Twelfth Day of September, 2017

Joseph Matal
*Performing the Functions and Duties of the
Under Secretary of Commerce for Intellectual Property and
Director of the United States Patent and Trademark Office*